C. M. STRETCHER.
CENTER GRINDER FOR LATHES AND THE LIKE.
APPLICATION FILED JULY 9, 1915.
1,178,035.
Patented Apr. 4, 1916.
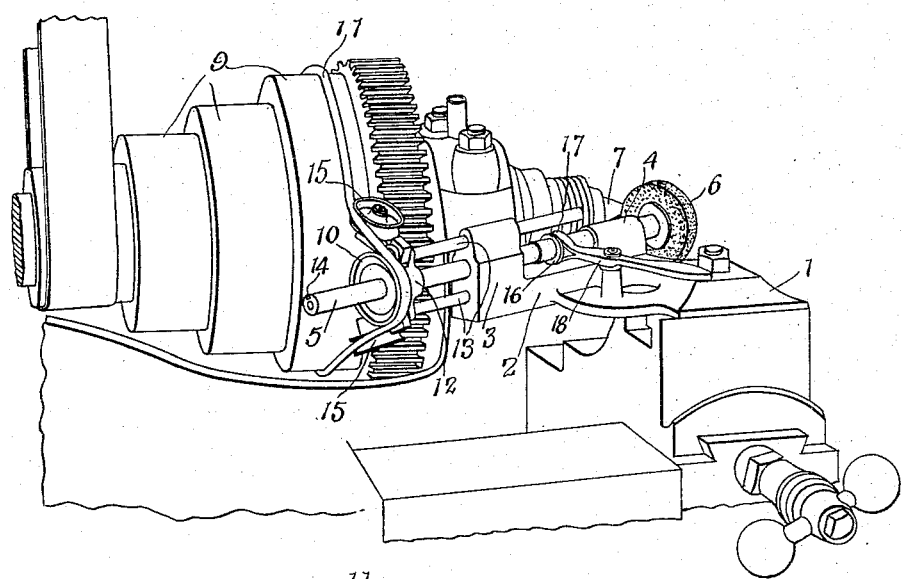
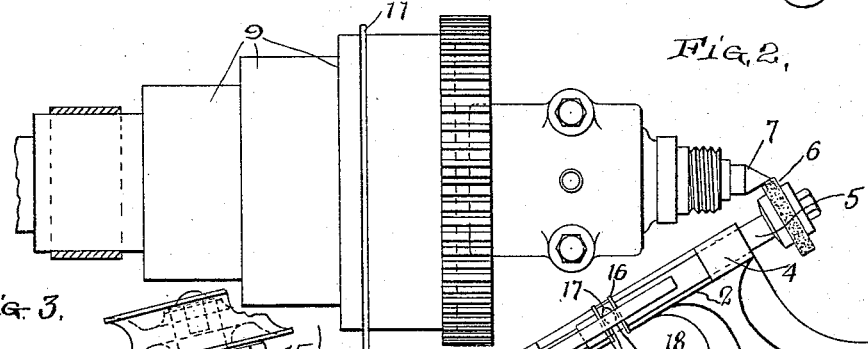
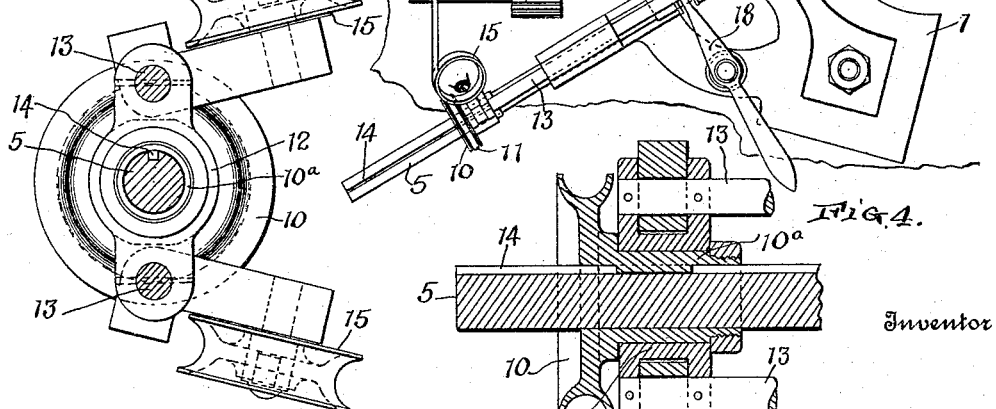
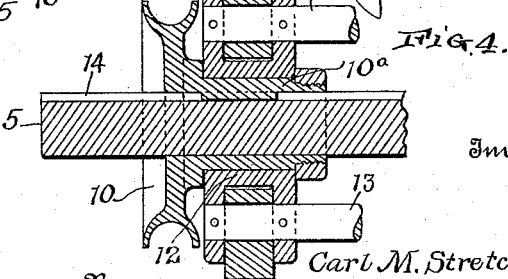
Inventor
Carl M. Stretcher,

UNITED STATES PATENT OFFICE.

CARL M. STRETCHER, OF SPRINGFIELD, OHIO, ASSIGNOR OF ONE-HALF TO CHARLES H. STEPHAN, OF SPRINGFIELD, OHIO.

CENTER-GRINDER FOR LATHES AND THE LIKE.

1,178,035.  Specification of Letters Patent.  Patented Apr. 4, 1916.

Application filed July 9, 1915. Serial No. 38,841.

*To all whom it may concern:*

Be it known that I, CARL M. STRETCHER, a citizen of the United States, residing at Springfield, in the county of Clark and State of Ohio, have invented certain new and useful Improvements in Center-Grinders for Lathes and the like, of which the following is a specification, reference being had therein to the accompanying drawing.

This invention relates to center grinders for lathes and the like and the object of the invention is to provide a very simple and highly efficient device for truing up or repointing the centers of lathes.

A further object of the invention is to provide such a device in which the grinding wheel will be moved on a fixed line extending obliquely to the axis of the lathe center, thus enabling the center to be ground to an exact angle.

A further object of the invention is to provide a device of this character which can be driven from the lathe mechanism, thereby eliminating the use of a separate motor; and, also, to make the driving device for the grinder shaft adjustable axially of the shaft to accommodate the same to different lathe mechanisms.

In the accompanying drawings, Figure 1 is a side elevation of a portion of a lathe showing my invention mounted in operative position thereon; Fig. 2 is a top, plan view of the same; Fig. 3 is a sectional view showing in elevation the driving pulley and belt guides; and Fig. 4 is a longitudinal, sectional view taken through the driving pulley and its shaft.

In these drawings I have illustrated one embodiment of the invention and have shown the same as comprising a support having mounted thereon a shaft carrying the grinding wheel and provided with driving mechanism. As here shown the support comprises a base or plate 1 adapted to be mounted on the lathe frame in any suitable manner, as by means of a bolt having a head to travel in the T-slot of the lathe frame. Carried by this plate is a frame 2 provided with two bearings 3 and 4 in which is journaled a shaft 5, this shaft being capable of both a reciprocatory and a rotatory movement in said bearings. Mounted on the end of the shaft is a grinding wheel 6 which may be of any suitable character such as the emery or carborundum wheels which are commonly used for this purpose. The support is mounted upon the lathe frame with the shaft 5 extending obliquely to the axis of the lathe center, which is shown at 7 and which is rotated by means of driving pulleys 9. The angle at which the shaft is set relatively to the axis of the center may, of course, vary but it is here shown at approximately 60 degrees which corresponds to the usual taper of the lathe center. The shaft 5 may be rotated in any suitable manner but for the sake of simplicity and economy in construction and to eliminate the necessity of separate driving mechanism I prefer to drive this shaft from the lathe mechanism and in the form here shown I have provided the shaft 5 with a driving pulley 10 which is connected by a belt 11 with the driving pulley 9 by means of which the lathe is driven. The pulley 10 must remain in a fixed position relatively to its driving pulley 9 in order to secure the best results and I have, therefore, provided auxiliary supporting devices for the pulley and, as here shown the pulley as provided with a sleeve $10^a$ which is rotatably mounted in and held against axial movement relatively to a fixed bearing 12 which is carried by two rods 13 which are mounted in the frame 2, and the pulley is provided with a key traveling in a groove 14 in the shaft, thus causing the shaft and pulley to rotate together, but permitting the shaft to move relatively to the pulley. Preferably, the rods 13 are adjustably mounted on the frame 2 of the support and, in the present instance, they are fitted snugly into guideways and may be driven axially to vary the position of the pulley 10 relatively to the driving mechanism of the lathe to either tighten the belt 11 or to accommodate the device to different driving mechanisms. Coöperating with the pulley are two guide pulleys 15 which are mounted on horizontal axes so that they may accommodate themselves to varying angles of the belt 11 and which serve to cause the belt 11 to engage the pulley 10 at substantially right angles to the shaft 5. Suitable means are also provided for imparting reciprocatory movement to the shaft 5 and thus causing the grinding wheel to travel along the tapered point of the lathe center to grind the same. This reciprocatory movement may be imparted to the shaft in any suitable manner and in the present type of machine is accomplished by a hand operated device, thereby putting the same directly under the control of the operator. As here shown the shaft is provided with a grooved collar 16 which receives a yoke 17 carried by a lever 18 pivotally mounted on the base 1 on a vertical axis.

The operation of the device will be readily apparent from the foregoing description and it will be understood that when the device has been mounted on the lathe frame at the proper angle to the axis of the lathe center and has been connected to the lathe by means of the belt 11, or other suitable driving connections, the lathe is operated to cause the center 7 to rotate. The operation of the lathe likewise causes the shaft 5 and the grinding wheel 6 to rotate and by operating the lever 18 the grinding wheel can be moved along the tapered surface of the center, thereby truing the same and restoring it to the proper angle.

It will also be apparent that the construction and operation of the device is exceedingly simple and that the device is of a very durable character and at the same time it is obvious that it possesses a high degree of efficiency and can be operated at a minimum cost because no extra power or driving devices are required other than the belt which connects the driving pulley of the lathe and the driving pulley of the grinding shaft.

While I have shown and described one embodiment of my invention it will be understood that this has been chosen for the purposes of illustration only and that I do not desire to be limited to the details of construction, shown and described, for obvious modifications will occur to a person skilled in the art.

Having thus fully described my invention, what I claim as new and desire to secure by Letters Patent, is:—

1. In a device of the character described, a support adapted to be mounted on a lathe or the like, a shaft mounted on said support for both rotatory and reciprocatory movement, a grinding wheel mounted on one end of said shaft, a driving member mounted about said shaft, an adjustable device for supporting said driving member on the support, and a connection between said driving member and said shaft to cause them to rotate together but permit the shaft to have axial movement relatively to the driving member.

2. In a device of the character described, a support adapted to be mounted on a lathe or the like, a shaft mounted on said support for both rotatory and reciprocatory movement, a grinding wheel on one end of said shaft, a bearing mounted about said shaft, a driving member mounted about said shaft and having a sleeve extending into said bearing between said bearing and said shaft, means to hold said pulley against axial movement relatively to said bearing and to cause said shaft to rotate with said pulley.

3. In a device of the character described, a support adapted to be mounted on a lathe or the like, a shaft mounted on said support for both rotatory and reciprocatory movement, a grinding wheel on one end of said shaft, a driving member mounted about said shaft and splined thereto, means adjustably mounted on said support for holding said driving member normally against axial movement, and means for imparting axial movement to said shaft.

4. In a device of the character described, a support adapted to be mounted on a lathe or the like, a shaft mounted in said support for both rotatory and reciprocatory movement, a grinding wheel mounted on one end of said shaft, rods adjustably mounted on said support, a bearing carried by said rods and extending about said shaft, a pulley splined to said shaft and having a sleeve mounted in said bearing between the same and said shaft, and means for holding said pulley against axial movement relatively to said bearing.

5. In a device of the character described, a support, a shaft mounted on said support for both rotatory and reciprocatory movement, a grinding wheel fixed to said shaft, an adjustable bearing, and a driving member feathered to said shaft and held against axial movement by said bearing.

6. In a device of the character described, a support, a shaft mounted on said support for both rotatory and reciprocatory movement, a grinding wheel fixed to said shaft, a driving member feathered to said shaft, a rod mounted on said support, and means at the end of said rod in engagement with said driving member to prevent the axial movement thereof.

7. In a device of the character described, a support, a shaft mounted on said support for both rotatory and reciprocatory movement, a grinding wheel fixed to said shaft, an adjustable bearing, a driving member feathered to said shaft and held against axial movement by said bearing, guiding means for directing a belt in proper relation to said driving member, said guiding means being mounted on said bearing, and means for reciprocating said shaft.

8. In a device of the character described, a support, a shaft mounted on said support for both rotatory and reciprocatory movement, a grinding wheel fixed to said shaft, a bearing connected with said support, a driving member feathered to said shaft and mounted in said bearing whereby said driving member is held against axial movement, guiding means mounted upon said bearing, said guiding means being arranged to direct a belt in the proper direction to said driving member, said guiding means being adjustably mounted on said bearing, and means for reciprocating said shaft.

9. In a device of the character described, a support, a shaft mounted in said support for both rotatory and reciprocatory movement, a grinding wheel fixed to said shaft, a driving member feathered to said shaft, a pair of rods each fixed at one end to said support, a bearing fixed to the opposite ends of said rods, said driving member being mounted in said bearing, whereby it is held against axial movement, guiding means mounted on said bearing and pivoted upon said rods, and means to reciprocate said shaft.

In testimony whereof, I affix my signature in presence of two witnesses.

CARL M. STRETCHER.

Witnesses:
CHARLES B. ZIMMERMAN,
M. RAY WEIKART.

Copies of this patent may be obtained for five cents each, by addressing the "Commissioner of Patents, Washington, D. C."